United States Patent [19]

Brewer et al.

[11] 4,325,997

[45] Apr. 20, 1982

[54] PROCESSABLE CELLULOSE ESTER COMPOSITIONS

[75] Inventors: Richard J. Brewer; Richard T. Bogan, both of Kingsport, Tenn.

[73] Assignee: Eastman Kodak Company, Rochester, N.Y.

[21] Appl. No.: 191,791

[22] Filed: Sep. 29, 1980

Related U.S. Application Data

[63] Continuation of Ser. No. 20,392, Mar. 14, 1979, abandoned.

[51] Int. Cl.³ .................. B32B 15/08; C08L 1/10; C08L 1/12; C08L 1/14
[52] U.S. Cl. .................. 428/31; 106/171; 106/176; 428/464
[58] Field of Search ............... 106/171, 176, 189, 188; 260/13, 22 EP; 428/464, 31

[56] References Cited

U.S. PATENT DOCUMENTS

| | | | |
|---|---|---|---|
| 2,719,089 | 9/1955 | Lovell | 105/176 |
| 2,964,484 | 12/1960 | Findley et al. | 106/171 |
| 3,003,978 | 10/1961 | Coney et al. | 106/171 |
| 3,839,051 | 10/1974 | Cerveny | 428/464 |
| 4,009,319 | 2/1977 | Cline | 428/464 |

FOREIGN PATENT DOCUMENTS 158916  9/1954  Australia .................. 106/176

*Primary Examiner*—Allan Lieberman
*Attorney, Agent, or Firm*—Clyde L. Tootle; Daniel B. Reece, III

[57] ABSTRACT

This invention is directed to processable cellulose esters having excellent adhesion to metal substrates and weatherability. These commercially useful cellulose ester compositions can be molded; extruded over metal foils, shaped and otherwise processed in a thermoplastic condition at elevated temperatures to provide products having improved ultraviolet light stability or weatherability and good color stability.

16 Claims, No Drawings

PROCESSABLE CELLULOSE ESTER COMPOSITIONS

This is a continuation of application Ser. No. 20,392 filed Mar. 14, 1979 and now abandoned.

This invention is directed to processable cellulose esters having excellent adhesion to metal substrates which provide finished decorative trim products having improved weatherability and good color stability.

Cellulose esters have been used extensively to prepare various molded, shaped, formed or extruded articles. These various articles when exposed to sunlight over an extended period of time tend to degrade and the physical properties of the molded articles are lowered to the point where the articles are no longer useful. Various materials have been suggested for stabilizing cellulose esters against the degradative effects of exposure to sunlight. These suggested stabilizers in general have been effective in improving the weatherability of cellulose esters to some extent, but a more effective stabilizer system is desired which provides for improved stabilization over longer periods of time. It would therefore be an advance in the art to provide a processable cellulose ester composition having improved weatherability, adhesion to metal foils and color stability.

An object of this invention is to prepare processable cellulose esters and their compositions which have improved weatherability. Another object of this invention is to provide processable cellulose ester plastic compositions having good adhesion to metal substrates and color stability.

In accordance with the present invention, easily processable cellulose esters are provided which comprise the addition of 5 to 15 parts by weight, preferably 5 to 10 parts by weight of at least one conventional acid accepting epoxy compound to a cellulose ester composition.

These easily processable cellulose ester compositions have good adhesion when extruded onto metal foil substrates to form decorative trim. Such metal foil substrates can be conventional metal foils such as aluminum foil and can be unprimed or, if desired, primed with conventional primers such as polyesters or polyurethanes. In general, it is well known in the art that metal foils are deleterious to the weatherability of cellulose ester compositions deposited thereon. The addition, however, of 5 to 15 parts by weight of the conventional acid accepting epoxy compound provided the unexpected improvement in processability of the cellulose ester composition which in addition also possessed good weatherability when extruded onto metal foils. If the epoxy compound is used in an amount less than 5 parts by weight, the resulting cellulose ester compositions do not have the desired processability and weatherability. If an amount greater than 15 parts by weight is used no further improvement is noted in the weatherability. In addition, varying amounts of conventional plasticizers normally employed in cellulose ester compositions may be used in conjunction with the 5 to 15 parts by weight epoxy compounds, but the addition of such conventional plasticizers are not necessary or required and easily processable cellulose ester compositions can be achieved without the addition of such conventional plasticizers.

Any conventional acid accepting epoxy compound can be used with similar results. Such acid accepting epoxy compounds are known to the art and include diglycidyl ethers of various polyglycols, particularly those polyglycols that are derived from condensation of say 8 to 40 moles of ethylene oxide or the like per mole of polyglycol product; diglycidyl ethers of glycerol and the like; metallic epoxy compounds (such as those conventionally utilized in and with vinylchloride polymer compositions); epoxidized ether condensation products; diglycidyl ethers of bisphenol A (i.e., 4,4'-dihydroxy diphenyl dimethane); epoxidized unsaturated fatty acid esters, particularly those having 1 to 12 carbon atom alkyl esters of 12 to 22 carbon atom fatty acids, such as butyl epoxy stearate and the like; and various epoxidized long chain fatty acid triglycerides and the like, such as the epoxidized vegetable and other unsaturated natural oils (which are sometimes referred to as being epoxidized natural glycerides or unsaturated fatty acids, which fatty acids generally contain between 12 and 22 carbon atoms) that may be specifically typified and particularized by such compositions as epoxidized soya bean oil.

Such acid accepting epoxy compound is a member of the group consisting of compounds having the formula

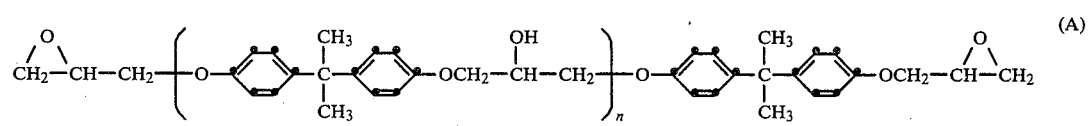 (A)

where n=0 to 12;

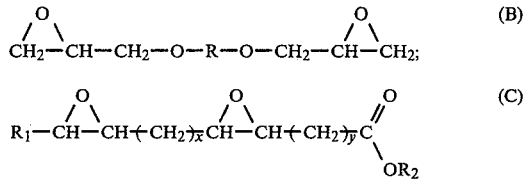

wherein
- $R_1$ is an alkylene having 1 to 12 carbon atoms, or arylene which can be substituted with alkyl or hydroxy;
- x and y is 1 to 10;
- $R_2$ is methyl, ethyl, propyl, butyl, hexyl or octyl;
- (D) epoxidized tallate; and
- (E) epoxidized soybean oil.

Conventional cellulose ester stabilizers may also be incorporated in the cellulose ester compositions of this invention. For example, the known potassium acid oxalate and acid citrate stabilizers may be employed in the cellulose ester compositions without adversely affecting the composition properties as well as other conventional additives such as pigments, colorants and the like.

The cellulose ester plastic compositions which are formulated in accordance with this invention are commercial organic cellulose esters of aliphatic acids, such as cellulose acetate, cellulose propionate, cellulose butyrate, cellulose acetate propionate, cellulose acetate butyrate and the like.

The following examples illustrate the use of the stabilizer system in accordance with this invention.

EXAMPLES

One hundred parts of cellulose acetate butyrate (381-20) having a butyryl content of about 37 weight percent, an acetyl content of about 13 weight percent, a hydroxy content of about 2 weight percent and a viscosity of 20 sec. as determined by ASTM Method D1343 was thoroughly mixed with from 0-15 parts of epoxidized soya bean oil and the mixtures were melt blended at about 300° F. on 2-roll mixing mills and granulated. The granulated plastic was compression molded at approximately 25 mils thickness onto commercial aluminum foil (1 inch wide, 2 mils thick) and the composites were subjected to accelerated weathering in an Atlas XWR Weather-Ometer (carbon arc) with the polymer film side directed toward the light source. After varying intervals of exposure samples were removed, the composite was separated, and the brittleness of the polymer film was evaluated by rapidly bending the film around a 1/16" mandrel. Any cracking in the film surface was noted as a brittle failure. To determine the adhesion of the polymer-foil composites, samples were submerged in 65° C. water and, after varying times of submersion, were removed, dried 24 hrs. at room temperature, and subjected to a 180° T-peel strength evaluation on an Intron Tensile Tester. The results of the above described tests are listed in Table I.

least one cellulose ester plastic of the group consisting of cellulose acetate, cellulose propionate, cellulose butyrate, cellulose acetate propionate, cellulose acetate butyrate and (2) about 5 to 15 parts by weight of an acid accepting liquid epoxy compound per 100 parts by weight of said cellulose ester plastic.

2. A processable cellulose ester plastic composition according to claim 1 wherein said acid accepting liquid epoxy compound is a member of the group consisting of compounds having the formula

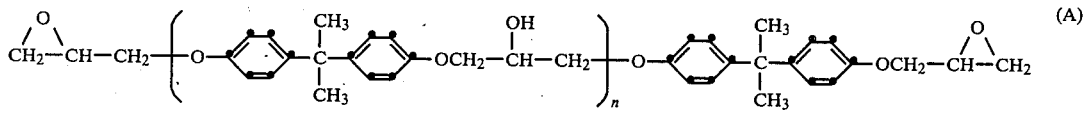

where $n = 0$ to 12;

$$\underset{CH_2-CH-CH_2-O-R-O-CH_2-CH-CH_2;}{\overset{O}{\triangle}\qquad\qquad\overset{O}{\triangle}} \quad (B)$$

$$\underset{R_1-CH-CH(CH_2)_xCH-CH(CH_2)_yC}{\overset{O}{\triangle}\quad\overset{O}{\triangle}\quad\overset{O}{\underset{OR_2}{\parallel}}} \quad (C)$$

wherein
$R_1$ is an alkylene having 1 to 12 carbon atoms, or arylene which can be substituted with alkyl or hydroxy;
x and y is 1 to 10;
$R_2$ is methyl, ethyl, propyl, butyl, hexyl or octyl;
(D) epoxidized tallate; and
(E) epoxidized soybean oil.

3. A processable cellulose ester composition according to claim 2 wherein said cellulose ester plastic is cellulose acetate butyrate.

TABLE I

Accelerated Weatherability and Adhesion of CAB-381-20/Vikoflex 7080 Epoxidized Soya Bean Oil Ester Compression Molded Onto Commercial Aluminum Foil

| Formulation | Vikoflex[a] 7080, pphr | I.V. After ½ hr. at 250° C. | 180° T-Peel Strength, lb/in, of CAB/Al Foil Composites After Submersion in 65° C. H₂O, Hrs. | | | | Flexibility[d] of CAB Films After Accelerated Ageing in Atlas XWR Weatherometer, Hrs. | | | | |
|---|---|---|---|---|---|---|---|---|---|---|---|
| | | | 24 | 50 | 150 | 300 | 0 | 250 | 750 | 1000 | 1250 |
| 1 | 0 (Control)[b] | 0.98 | ←Self Delaminated→ | | | | Pass | 'Pass | Fail | Fail | Fail |
| 2 | 5[c] | 1.26 | 2.8 | 3.7 | 3.7 | f | " | " | Pass | Pass | " |
| 3 | 7.5[c] | 1.33 | 3.5 | f | f | f | " | " | " | " | Pass |
| 4 | 10.0[c] | 1.23 | 3.7 | f | f | f | " | " | " | " | " |
| 5 | 5[e] | 1.25 | 2.5 | 2.8 | 3.0 | f | " | " | " | " | Fail |
| 6 | 7.5[e] | 1.20 | 3.0 | 2.8 | — | f | " | " | " | " | " |
| 7 | 10[e] | 1.28 | 3.0 | 2.5 | 3.0 | f | " | " | " | " | Pass |
| 8 | 15[e] | 1.20 | 3.5 | 2.7 | 2.9 | 2.5 | " | " | " | " | " |

[a]Epoxidized Soya Bean Oil Ester.
[b]Contained 100 parts CAB-381-20 ester, 7.0 pphr dioctyl azelate plasticizer, 2.0 pphr Resorcinol Monobenzoate - (RMB), 0.3 pphr Irganox 1010.
[c]Formulations also contained 100 parts CAB-381-20 ester, 7.0 pphr dioctyl azelate conventional plasticizer in addition to the Vikoflex 7080, 2.0 pphr RMB, 0.3 pphr Irganox 1010.
[d]Films (removed from foil) rapidly flexed around 1/16" mandrel.
[e]Formulations also contained 100 parts CAB-381-20 ester, 2.0 pphr RMB, 0.3 pphr Irganox 1010.
[f]Films self delaminated from foil substrate.

The invention has been described in detail with particular reference to certain preferred embodiments thereof, but it will be understood that variations and modifications can be effected within the spirit and scope of the invention.

We claim:

1. A processable halogenated phosphoric ester free cellulose ester plastic composition comprising (1) at 4. A processable cellulose ester composition according to claim 3 wherein said epoxy compound is epoxidized soya bean oil.

5. A processable halogenated phosphoric ester free cellulose ester plastic composition comprising (1) at least one cellulose ester plastic of the group consisting of cellulose acetate, cellulose propionate, cellulose butyrate, cellulose acetate propionate, cellulose acetate butyrate and (2) about 5 to 10 parts by weight of an acid accepting liquid epoxy compound per 100 parts by weight of said cellulose ester plastic.

6. A processable cellulose ester plastic composition according to claim 5 wherein said acid accepting epoxy compound is a member of the group consisting of compounds having the formula

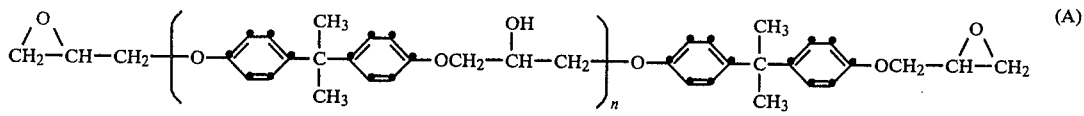

where n=0 to 12;

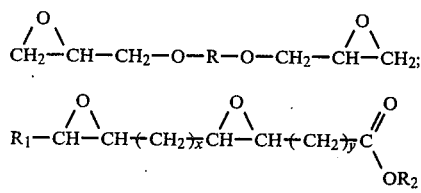

wherein
- R₁ is an alkylene having 1 to 12 carbon atoms, or arylene which can be substituted with alkyl or hydroxy;
- x and y is 1 to 10;
- R₂ is methyl, ethyl, propyl, butyl, hexyl or octyl;

(D) epoxidized tallate; and
(E) epoxidized soybean oil.

7. A processable cellulose ester composition according to claim 6 wherein said cellulose ester plastic is cellulose acetate butyrate.

8. A processable cellulose ester composition according to claim 7 wherein said epoxy compound is epoxidized soya bean oil.

9. Decorative trim prepared by extruding the composition of claim 1 onto metal foil.

10. Decorative trim according to claim 9 wherein said metal foil is aluminum foil.

11. Decorative trim prepared by extruding the composition of claim 4 onto metal foil.

12. Decorative trim according to claim 11 wherein said metal foil is aluminum foil.

13. Decorative trim prepared by extruding the composition of claim 5 onto metal foil.

14. Decorative trim according to claim 13 wherein said metal foil is aluminum foil.

15. Decorative trim prepared by extruding the composition of claim 8 onto metal foil.

16. Decorative trim according to claim 15 wherein said metal foil is aluminum foil.

* * * * *